UNITED STATES PATENT OFFICE.

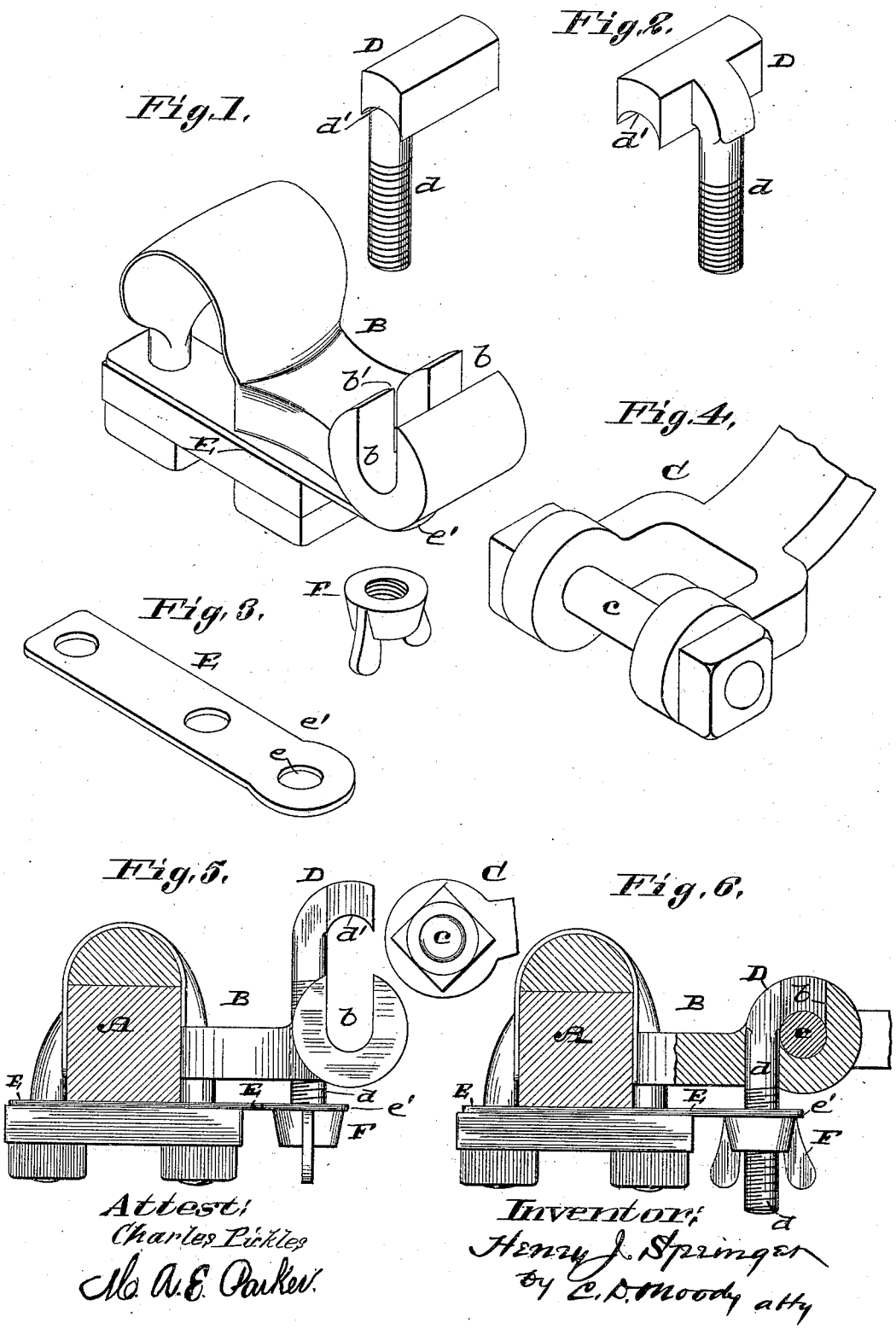

HENRY J. SPRINGER, OF EDWARDSVILLE, ILLINOIS.

THILL-COUPLING.

SPECIFICATION forming part of Letters Patent No. 343,927, dated June 15, 1886.

Application filed November 2, 1885. Serial No. 181,551. (No model.)

*To all whom it may concern:*

Be it known that I, HENRY J. SPRINGER, of Edwardsville, Illinois, have made a new and useful Improvement in Thill-Couplings, of which the following is a full, clear, and exact description.

The improvement relates to that class of thill-couplings which are detachable and anti-rattling.

It consists in the peculiar means for securing the thill-iron in the axle part of the coupling, and, in connection therewith, in the means for preventing rattling.

The annexed drawings, making part of this specification, and illustrating the improvement, consists as follows:

Figure 1 is a view in perspective of the axle-iron. Fig. 2 is a view showing in perspective and in two positions the thill-iron-locking piece. Fig. 3 is a view in perspective of the spring and nut. Fig. 4 is a view in perspective of the thill-iron. Fig. 5 is a side elevation of the axle portion of the coupling, the locking-piece being raised and the thill-iron being detached; and Fig. 6 is a sectional elevation of the coupling.

The same letters of reference denote the same parts.

A, Figs. 5, 6, represents the axle.
B represents the axle-iron.
C represents the thill-iron.
D represents the part termed the "locking-piece," used to secure the thill-iron in the axle-iron.

E represents the spring-plate, which is attached to the axle-iron, and used both as a bearing for the nut F and also, and by reason of its springiness, as a means for keeping together the parts of the coupling as they wear, and thereby prevent rattling. The axle-iron is of the customary form, saving that it is, in addition to the opening or transvere slot $b$, for receiving the bolt $c$ of the thill-iron, perforated vertically at $b'$ in rear of the slot $b$, to receive the shank $d$ of the locking-piece D. After the bolt $c$ of the thill-iron has been dropped into the slot $b$ of the axle-iron the shank $d$ of the locking-piece is passed downward through the perforation $b'$, and also through the perforation $e$ of the spring-plate E and the locking-piece, which on its under side, $d'$, is curve shaped to bear upon the thill-iron bolt, is drawn downward in the opening $b$, so as to confine the thill-iron bolt therein, substantially as shown in Fig. 6, by means of the nut F, which is screwed upon the shank $d$ until it comes to a bearing against the plate E. This last-named part, so far as supplying a bearing for the nut is concerned, and thereby serving to fasten the locking-piece in the axle-iron above the thill-iron bolt, may be a rigid plate; but it is made of springy material, as thereby in applying the nut the free end $e'$ of the plate E may be sprung upward sufficiently to exert a tension upon the locking-piece through the nut, and thereby keep the locking-piece, the thill-iron bolt, and the bolt bearing at the bottom of the slot $b$ closed together as those last-named parts wear away. The shank $d$ of the locking-piece D is offset from the body, so as to fit with the perforation $b'$, and the upper outer surface of the top of the shank, as well as the body, is curved to make a smooth finish in the axle-iron when the locking-piece is placed in position.

I am aware that it is not broadly new in devices of this general description to provide a locking-piece adapted to be clamped by bolt and nut over the thill-iron.

I claim—

The combination of the axle-iron B, having transverse slot $b$ and vertical perforation $b'$ in the rear of the slot $b$, the spring-plate $e$, the locking-piece D, curved on its under side at $d'$, and having bolt $d$ offset from it, the top of the shank of said bolt and the locking-piece being curved, the thill-iron C, having bolt $c$ and the nut F, substantially as and for the purposes set forth.

Witness my hand.

HENRY J. SPRINGER.

Witnesses:
O. J. SPRINGER,
R. F. TUNNELL.